(12) United States Patent
Silva

(10) Patent No.: US 6,882,471 B1
(45) Date of Patent: Apr. 19, 2005

(54) OPTICAL DISPLAY ASSEMBLY CLAMP

(75) Inventor: Luis A. Silva, Phoenix, AZ (US)

(73) Assignee: Litton Systems, Inc., Los Angeles, CA (US)

( * ) Notice: Subject to any disclaimer, the term of this patent is extended or adjusted under 35 U.S.C. 154(b) by 218 days.

(21) Appl. No.: 10/249,334

(22) Filed: Apr. 1, 2003

Related U.S. Application Data

(60) Provisional application No. 60/319,161, filed on Apr. 1, 2002.

(51) Int. Cl.⁷ .................................................. G02B 23/00
(52) U.S. Cl. ...................................................... 359/409
(58) Field of Search ................................ 359/407, 409, 359/410, 411, 480, 481; 250/214 VT

(56) References Cited

U.S. PATENT DOCUMENTS

| | | | | |
|---|---|---|---|---|
| 4,139,268 A | * | 2/1979 | Litman ........................ | 359/825 |
| 5,745,287 A | | 4/1998 | Sauter ........................ | 359/428 |
| 5,793,528 A | | 8/1998 | Wallace et al. .............. | 359/419 |
| 5,877,902 A | | 3/1999 | Sauter ........................ | 359/809 |
| 5,884,884 A | | 3/1999 | Sauter ........................ | 248/314 |
| 5,902,996 A | | 5/1999 | Sauter ........................ | 250/214 |
| 5,940,228 A | * | 8/1999 | Burnett ....................... | 359/825 |
| 6,000,667 A | | 12/1999 | Isbell et al. ................. | 248/201 |
| 6,061,945 A | | 5/2000 | Wallace et al. .............. | 42/101 |
| 6,073,895 A | | 6/2000 | Isbell et al. ................. | 248/201 |
| 6,172,821 B1 | | 1/2001 | Isbell et al. ................. | 359/809 |
| 6,295,170 B1 | | 9/2001 | Wallace et al. ............. | 359/813 |

\* cited by examiner

*Primary Examiner*—Mark A. Robinson
*Assistant Examiner*—Alessandro Amari
(74) *Attorney, Agent, or Firm*—Marsteller & Associates, P.C.

(57) ABSTRACT

A viewer device (G) has at least one monocular assembly (10) having a focus ring (12) that is accessible externally for adjusting optical focus of the viewer (G). A clamping assembly (18) for the viewer includes a band (20) that is controllably secured about a portion of an exterior surface (22) of the monocular (10). At least one pin body (24) extends from the band (20). The pin (24) is secured to the band (20) at a base end (26). An opposite pin end (28) extends toward and overlaps at least a portion of the focus ring (12). The focus ring (12) has at least one cooperating member (30) that is formed with an exterior surface (30) of the focus ring (12). When the band (20) is secured, the pin (24) engages the cooperating member (30) of the focus ring (12) to secure the focus ring (12) from undesired movement.

5 Claims, 4 Drawing Sheets

OPTICAL DISPLAY ASSEMBLY CLAMP

CROSS REFERENCE TO RELATED APPLICATIONS

This application claims the benefit of U.S. Provisional Application Ser. No. 60/319,161, filed Apr. 1, 2002, entitled OPTICAL DISPLAY ASSEMBLY CLAMP.

BACKGROUND OF INVENTION

1. Technical Field

This invention relates generally to viewing devices having an optical path that has a manually adjustable focus, and more particularly to a method and system for preventing undesired movement of the focus ring.

2. Background Art

The present Optical Display Assembly ("ODA") Clamp is a lightweight fixture to be used with viewer devices, such as known types of Aviators Night Vision Imaging Systems (ANVIS) goggles. The present invention prevents the objective lenses on the goggles from rotating and disturbing their focus setting, due to the weight of a ODA mounted with the goggle.

No known specific method exists to date that will perform the functions of the ODA Clamp. Consequently, users of certain types of night vision goggles have experienced a loss or movement of desired focus setting during normal operation of the night vision goggles.

While the above cited references introduce and disclose a number of noteworthy advances and technological improvements within the art, none completely fulfills the specific objectives achieved by this invention.

SUMMARY OF INVENTION

In accordance with the present invention, a viewer device, such as a night vision goggle, has at least one monocular assembly having a focus ring that is accessible externally for adjusting optical focus of the viewer. The monocular assembly is of the type that is adaptable for use with an optical display assembly. An optical display assembly is attached to the objective lens of the monocular assembly, which is in turn attached to the focus ring. A clamping assembly for the optical display assembly includes a band that is controllably secured about a portion of an exterior surface of the monocular assembly. At least one pin body extends from the band. The pin is secured to the band at a base of the pin. An end of the pin body that is opposite to the base end of the pin extends toward and overlaps at least a portion of the focus ring. The focus ring has at least one cooperating member that is formed with an exterior surface of the focus ring. When the band is secured, the pin body engages the cooperating member of the focus ring to secure the focus ring from undesired movement.

The present ODA Clamp will allow the operator to retain the desired focus setting (objective lenses) under normal operation. It will also give the operator more freedom of movement, without having to worry about his motion disturbing the focus setting on their ANVIS goggle.

The present invention provides positive support for objective lens, which permits the retaining of the focus setting.

The present ODA Clamp does not require any tools to install, remove, or adjust.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

DETAILED DESCRIPTION

Figure 1:
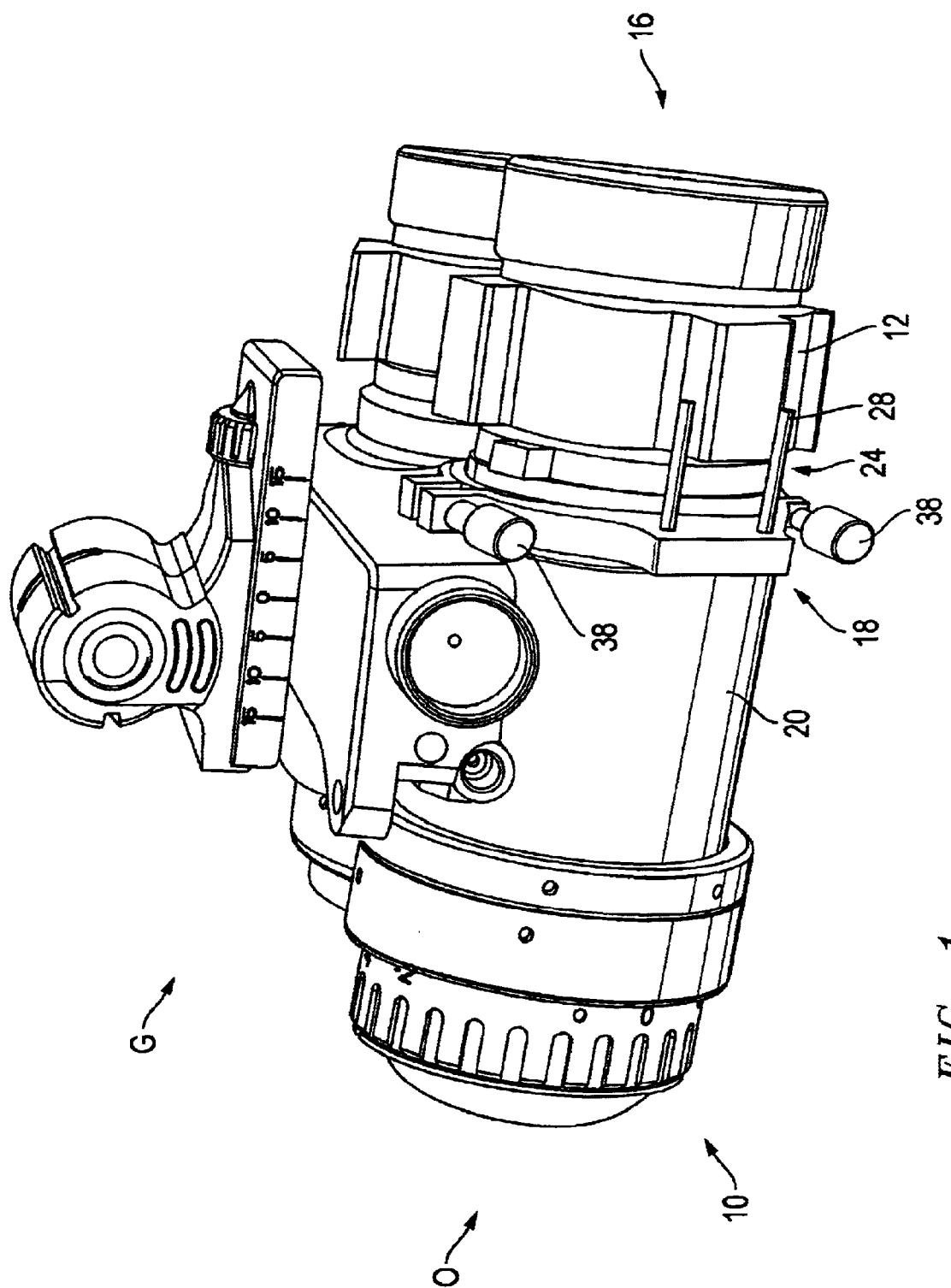
FIG. 1 is a side view of a portion of the optics for a night vision device having the present invention.
Figure 2:
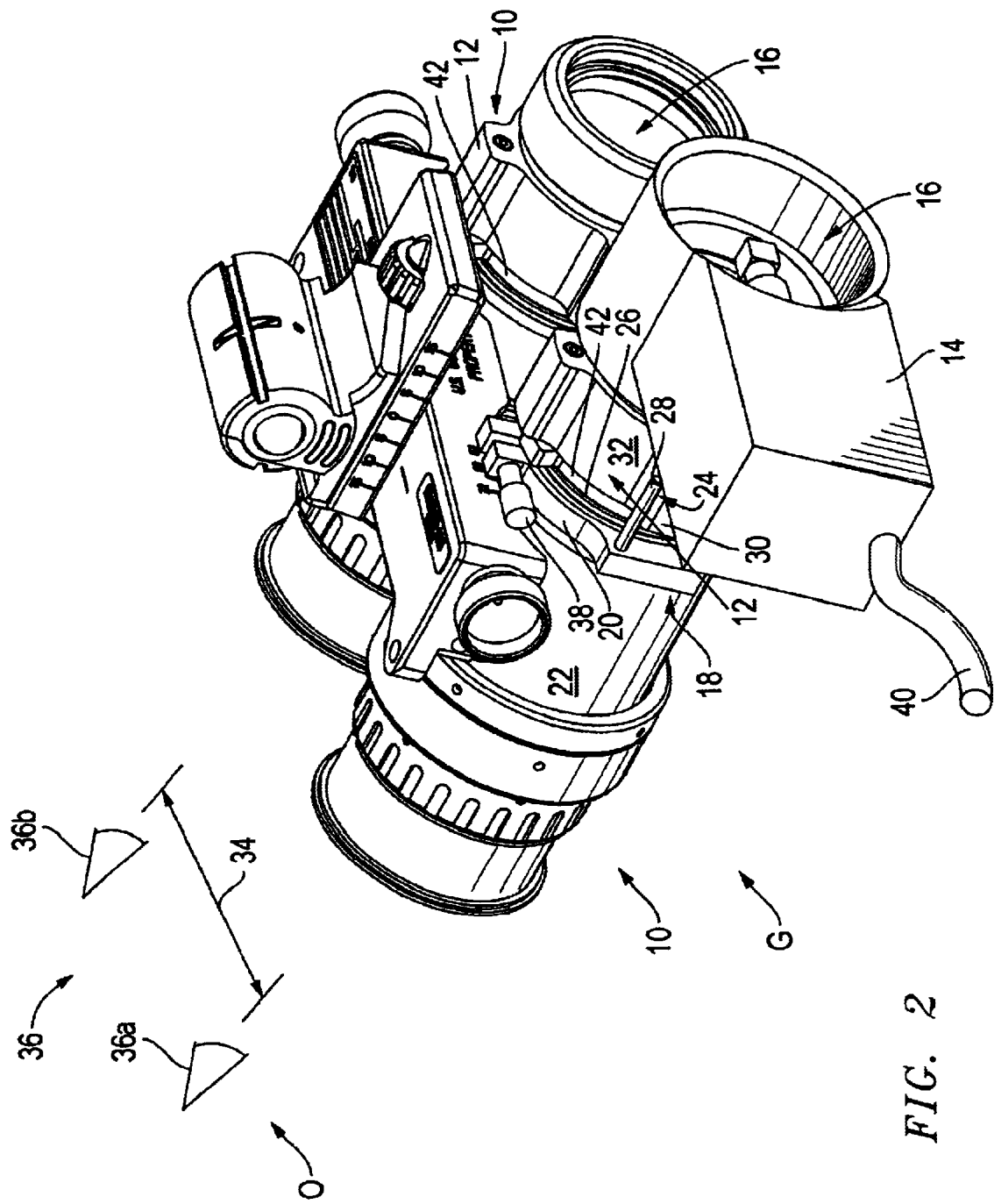
FIG. 2 is a right front isomeric view of night vision goggles having the present optical display assembly clamp.
Figure 3:
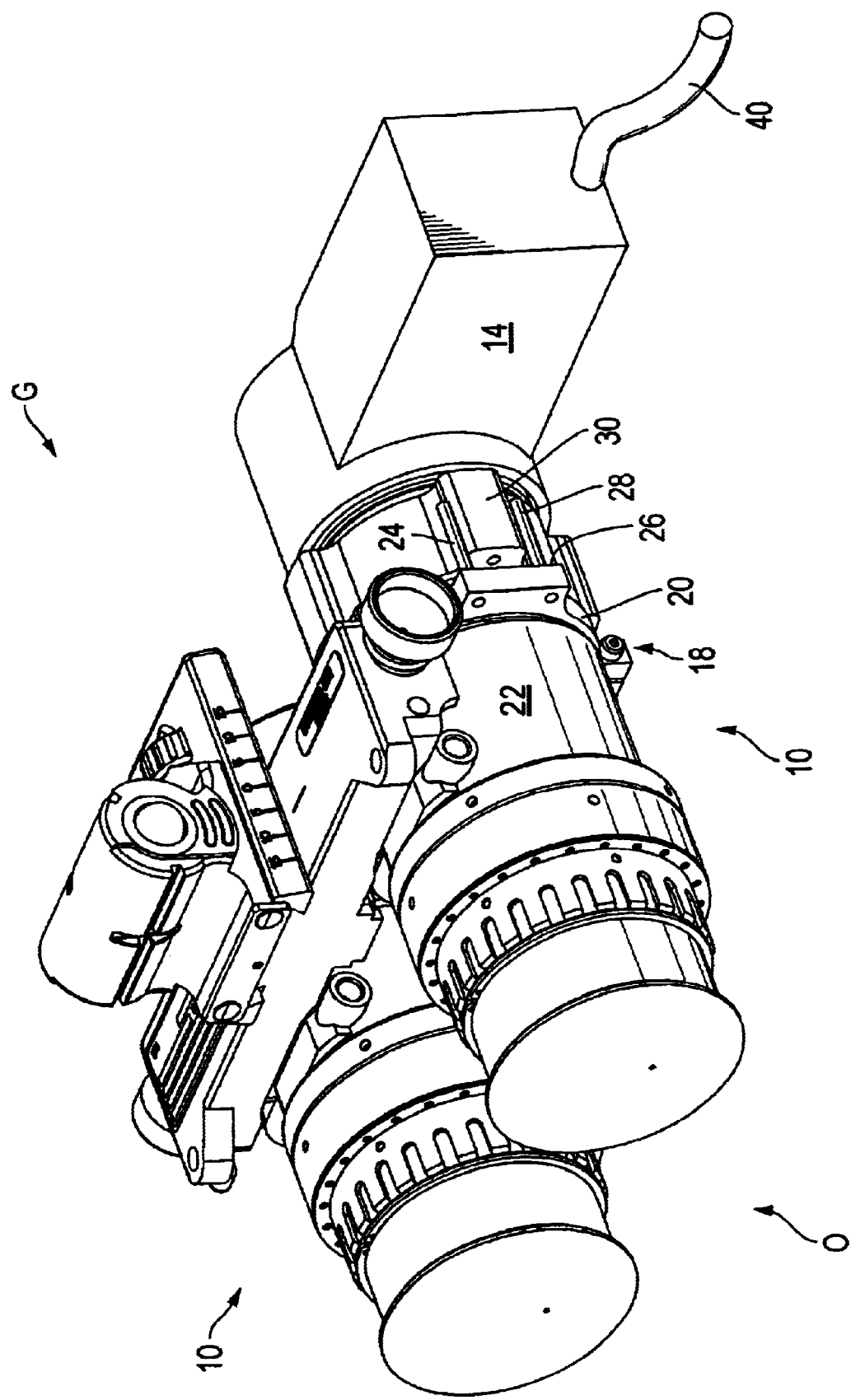
FIG. 3 is a right rear isomeric view of a night vision goggle housing with the present invention.
Figure 4:
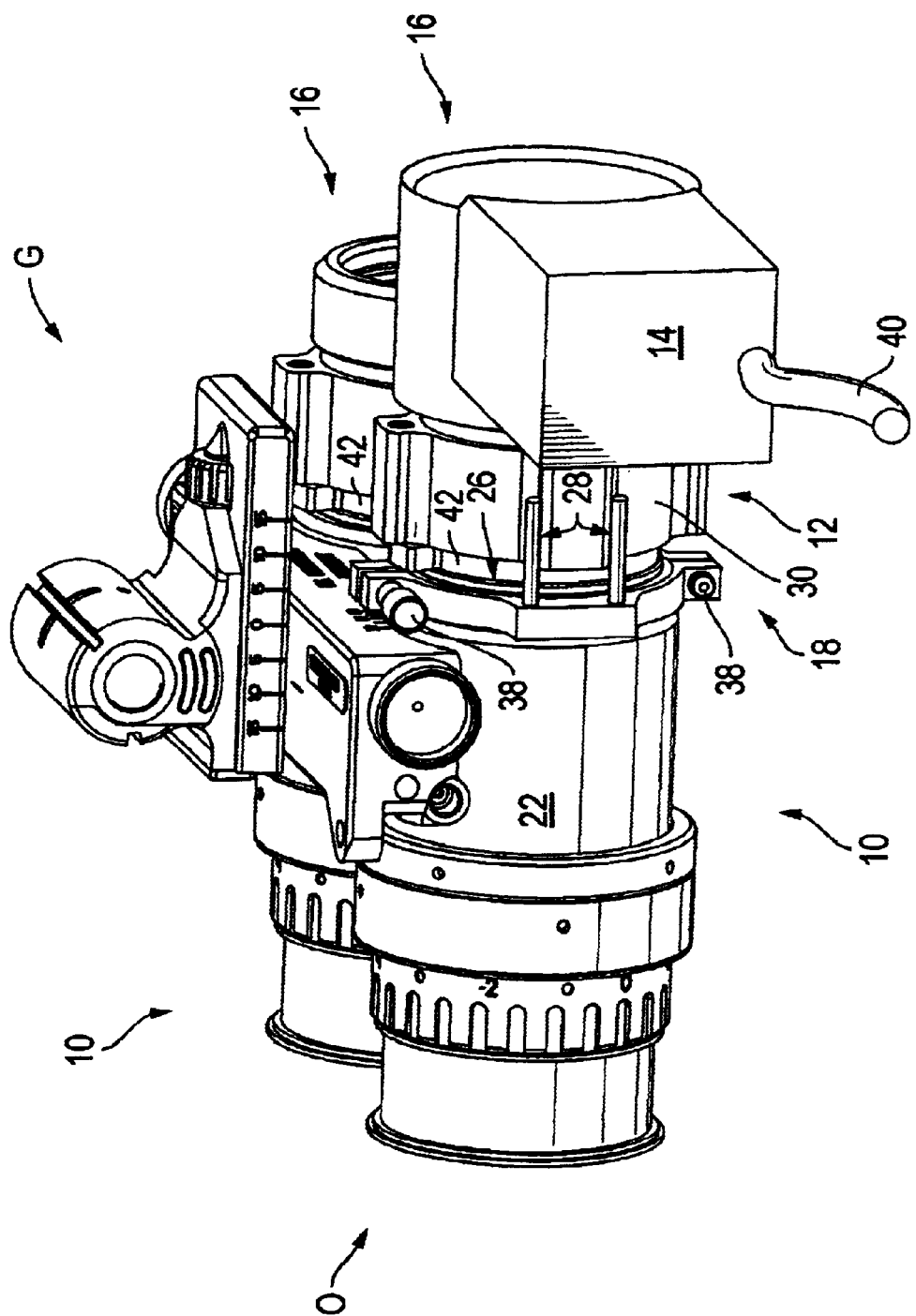
FIG. 4 is a right side elevational view.

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

A viewer device G, such as a night vision goggle, has at least one monocular assembly 10 that has a focus ring 12 accessible externally for adjusting optical focus of the viewer C. An optical display assembly (ODA) 14 is attached to the objective lens 16 of the monocular assembly 10, which is in turn attached to the focus ring 12. A clamping assembly 18 for use with the optical display assembly 14 includes a band 20 that is controllably secured about a portion of an exterior surface 22 of the monocular assembly 10. At least one pin body 24 extends from the band 20. The pin 24 is secured to the band 20 at a base 26 of the pin. An opposite end 28 of the pin body 24 that is opposite to the base end 26 of the pin 24 extends toward and overlaps at least a portion of the focus ring 12.

The focus ring 12 has at least one cooperating member 30 that is formed with an exterior surface 32 of the focus ring 12. When the band 20 is secured, the pin body 24 engages the cooperating member 30 of the focus ring 12 to secure the focus ring 12 from undesired movement.

FIG. 1 illustrates one embodiment of the ODA clamp assembly 18 of the present invention. A known type of night vision device G, such as an ANVIS type of goggle having two monocular assemblies 10 mounted side by side and parallel to each other. The distance between the two monoculars to is approximately equal to the distance between pupils of the operator's O two eyes 36a and 36b.

Generally, at least one of the monoculars 10 has an objective focus ring 12 that is used to adjust the focus of the optical path. A portion of a band 20 is removably mounted about or on the monocular 10 in proximity to the focus ring 12. The band 20 is secured with a screw assembly 38 or other type of releasable system to controllably restrain the band 20 from movement about the monocular 10.

At least one, and preferably two or more, pins 24 extend from the band 20 toward the focus ring 12 such that a cooperating member 30, such as ears, protrusions or indentations, that is formed with the exterior surface 32 of the focus ring 12 cooperate with the band 20 and pin 24 to become locked in place when the band 20 is secured.

Operation Details

The following is an example of preferred installation steps by a user, and subsequent operation of the present ODA clamp 18 on a known type of night vision device or goggle G.

Pre-Flight

Set objective focus so that objective lens 16 is at or near the infinity stop position.

Install clamp assembly 18 over the objective retainer stop ring 42 so that the two dowel pins 24 straddle one of the objective focus lobes 30 that is facing outward. This will make the two thumbscrews 38 used for tightening the clamp 18 easily accessible.

Tighten the two thumbscrews 38 just enough to hold the clamp mechanism 18 in place, but not so much as to prevent the objective lens 16 from rotating.

Install a Clip-on Power Source (COPS, typically provided with ANVIS goggle) and turn sight ON.

Set the objective lens 16 for best focus at infinity.

Tighten both thumbscrews 38 finger tight sufficient enough to prevent objective 16 from rotating.

Install the ODA 14, visually aligning it to the proper orientation.

Power up both the ODA 14 and ANVIS G, and if required, adjust alignment of ODA 14.

In-Flight Adjustments

In the event it is necessary for the operator O to readjust objective focus for close up viewing (less than infinity focus), loosen one of the thumbscrews 38 just enough to permit the objective lens 16 to rotate.

Rotate the objective 16 to obtain optimum focus of the desired target area.

Tighten the thumbscrew 38 when the preferred focus setting has been achieved.

The ODA Clamp 18 allows the operator O to retain the desired focus settings. Prior to the present invention, the operator O needed to constantly re-set focus, as the weight of the ODA 14 and its cable 40 would constantly rotate the objective lenses 16 in which the ODA 14 was mounted. The rotating of the objective lenses 16 would cause the goggle G to get out of focus. Furthermore, the operator O will be able to move more freely, without having to worry about their movements to move the ODA 14, and subsequently the objective lenses 16, affecting the operator's O focus settings.

The clamping mechanism 18 of the present invention is a simple lightweight clamping mechanism that, when installed, will prevent the objective 16 from rotating. Installation of the clamping mechanism 18 is tool-less, that is, no tools are required to install the clamp 18 onto the ANVIS body 10.

Optionally, the clamp band 20 is formed from 2 clamp halves that are machined from lightweight aluminum alloy to achieve a high strength-to-weight ratio. The two thumbscrews 38 will be machined from 304 series CRES to provide excellent corrosion protection and will be captivated to the clamp to prevent being lost. All components of the clamping mechanism 18 preferably have a matte black surface finish applied in accordance with MIL-STD-171. The weight of the assembly 18 is desired to be less than 10 grams.

The foregoing disclosure and description of the invention are illustrative and explanatory thereof, and various changes in the size, shape and materials, as well as in the details of the illustrated construction may be made without departing from the spirit of the invention.

What is claimed is:

1. A clamping assembly for a viewer device of the type having at least one monocular assembly adapted for receiving an optical display assembly, the monocular assembly having a focus ring accessible externally for adjusting optical focus of the viewer, the improvement comprising:

a band controllably secured about a portion of an exterior surface of the monocular assembly;

at least one pin body extending from the band, the pin secured to the band at a base of the pin, an end of the pin body opposite to the base end of the pin extending toward and overlapping at least a portion of the focus ring; and the focus ring having at least one cooperating member formed with an exterior surface of the focus ring;

whereby securing the band engages the pin body with the cooperating member of the focus ring to secure the focus ring from undesired movement.

2. The invention of claim 1 further including an optical display assembly for attaching to an objective lens of the monocular assembly.

3. The invention of claim 1 wherein the band extends around the exterior surface of the monocular assembly.

4. The invention of claim 1 further including removable securing means for securing the band to the exterior surface of the monocular assembly.

5. The invention of claim 4 wherein the removable securing means is at least one screw for locking the band.

* * * * *